No. 667,535. Patented Feb. 5, 1901.
A. KUHNERT.
APPARATUS FOR SEPARATING STONES FROM EARTHY OR OTHER MATERIALS.
(Application filed Aug. 7, 1900.)
(No Model.)
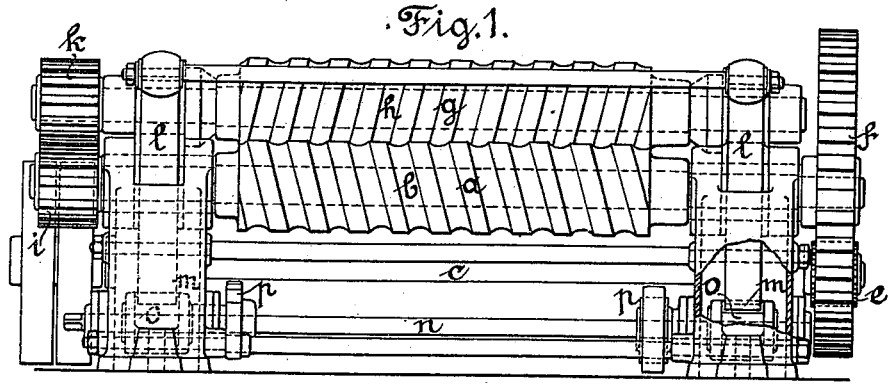
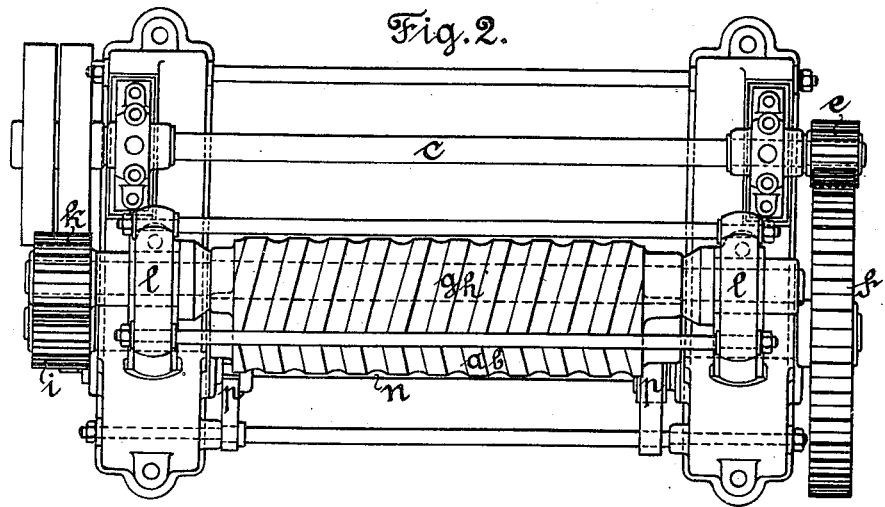
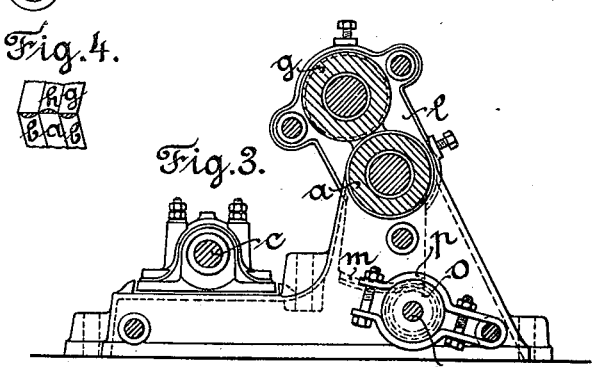
Witnesses
Chas H Smith
J. Staib
Inventor
August Kuhnert
per L. W. Serrell & Son
attys
THE NORRIS PETERS CO., PHOTO-LITHO., WASHINGTON, D. C.

UNITED STATES PATENT OFFICE.

AUGUST KUHNERT, OF LOBTAU, GERMANY.

APPARATUS FOR SEPARATING STONES FROM EARTHY OR OTHER MATERIALS.

SPECIFICATION forming part of Letters Patent No. 667,535, dated February 5, 1901.

Application filed August 7, 1900. Serial No. 26,146. (No model.)

*To all whom it may concern:*

Be it known that I, AUGUST KUHNERT, a subject of the King of Saxony, and a resident of Löbtau, near Dresden, Kingdom of Saxony, German Empire, have invented certain new and useful Improvements in Apparatus for Separating Stones from Earthy or other Materials, of which the following is a specification.

The present invention relates to an apparatus for separating stones from loam and clay in an expeditious and effective manner. To this end two rollers are employed, working one upon or against the other, one of which is driven in any suitable manner, and the other is actuated thereby by means of gearing. In each roller there is formed a helical groove or furrow of slight depth, which extends the whole length of the roller. The rollers are so arranged with relation to each other that the flat portion of one roller lying between two grooves or furrows will come exactly opposite a groove or furrow of the other roller. By this arrangement a channel of suitable section, preferably of lens-like section, is formed extending in a helical line along the rollers. On rotating the rollers the stones contained in the mass to be freed will be carried forward and cast out on one end or the other of the machine, while the loam and clay itself, fully cleaned, passes between the rollers, small stones being crushed by the latter.

A form of the apparatus for carrying out the above object is shown in the accompanying drawings.

Figure 1 is a face view; Fig. 2 a plan, and Fig. 3 a section. Fig. 4 is a fragmentary view of the upper and lower rollers.

$a$ is the lower roller, with the helical groove or furrow $b$. This roller is driven from a belt-pulley through the axle $c$ and toothed wheels $e\ f$.

$g$ is the upper roller, with a helical groove or furrow $h$. This roller receives its motion from the toothed wheel $i$, mounted at the other end of the axle of the roller $a$, the said toothed wheel $i$ being in gear with the toothed wheel $k$ on the axle of the roller $g$.

The grooves of the two rollers $a$ and $g$ are arranged relatively to each other in the manner represented at Fig. 4—that is to say, a flat portion situated between two grooved or recessed portions of one roller will come exactly opposite the grooved portion of the other roller, so that on turning the rollers the stones contained in the loam and clay under treatment will lie in the grooves or furrows and be carried away to one or the other end of the machine, while the loam and clay, freed from stones or other large substances, passes between the rollers $a$ and $g$.

In order to change the angle of the roller $g$ with respect to the roller $a$, the following arrangement has been devised: Roller $g$ is carried between two cheeks $l$, loosely mounted on the axle of the roller $a$, which cheeks are extended beyond the axle and are formed as toothed sectors $m$. Into each of these sectors takes a toothed wheel $o$, mounted on the axle $n$ of the framing. On turning this axle $n$ the toothed wheels $o$ are rotated and cause a change of position of the cheeks $l$ and a corresponding movement of the roller $g$ around the roller $a$. The loam and clay to be cleaned will thus pass between the rollers at a greater or lesser degree of inclination, and thereby be more readily under control. To prevent any change of position of the said cheeks when the rollers are moving, two clamping-pieces $p$ (operating as brakes) are mounted on the axle $n$, which said pieces $p$ hold the said axle $n$ securely and prevent it from rotating, the said piece $p$ being loosened when it is necessary to alter the position of the rollers $g$, but tightened up again after that operation is completed.

Having now particularly described and ascertained the nature of my said invention and in what manner the same is to be performed, I declare that

What I claim is—

1. In an apparatus for removing stony bodies from loam and clay a pair of adjacent coöperating rollers and means for revolving the same, both of said rollers being provided with a helical groove of segmental cross-section running lengthwise of the rollers, the convolutions being separated so that there is an intermediate flat face of the cylinder approximately as wide as the groove, the flat face on one cylinder not entering the groove in the other cylinder, substantially as specified.

2. In an apparatus for removing stony bodies from loam and clay, a pair of rollers and means for revolving the same, both of said rollers being provided with a helical groove of segmental cross-section and of separated convolutions, and the said rollers so placed that a groove on one roller is adjacent to a plain surface on the other roller which relation is always maintained, the flat surface on one roller not entering the groove in the other roller, substantially as and for the purposes set forth.

3. In an apparatus for removing stony bodies from loam and clay, the combination with the rollers $a$ and $g$ and means for revolving the same, of the cheek-pieces $l$ for receiving the shaft of the roller $g$, a toothed sector $m$ at the lower end of each cheek-piece, the shaft $n$ and toothed wheels $o$ upon said shaft for engaging the toothed sector $m$, to vary the relative position of the roller $g$ in respect to the roller $a$ at will, substantially as and for the purposes set forth.

In testimony that I claim the foregoing as my invention I have signed my name, in presence of two witnesses, this 9th day of July, 1900.

AUGUST KUHNERT.

Witnesses:
WILHELM WIESENHÜTTER,
PAUL ARRAS.